United States Patent
Ye

(10) Patent No.: US 10,183,871 B2
(45) Date of Patent: Jan. 22, 2019

(54) INTEGRATED FAUCET FILTRATION SYSTEM

(71) Applicant: AS IP Holdco, LLC, Piscataway, NJ (US)

(72) Inventor: Xiaojing Ye, Edison, NJ (US)

(73) Assignee: AS IP Holdco, LLC, Piscataway, NJ (US)

( * ) Notice: Subject to any disclaimer, the term of this patent is extended or adjusted under 35 U.S.C. 154(b) by 19 days.

(21) Appl. No.: 15/276,982

(22) Filed: Sep. 27, 2016

(65) Prior Publication Data

US 2017/0101325 A1 Apr. 13, 2017

Related U.S. Application Data

(60) Provisional application No. 62/238,910, filed on Oct. 8, 2015.

(51) Int. Cl.
| | |
|---|---|
| C02F 1/00 | (2006.01) |
| E03C 1/04 | (2006.01) |
| B01D 35/04 | (2006.01) |
| E03C 1/02 | (2006.01) |

(52) U.S. Cl.
CPC ............ *C02F 1/003* (2013.01); *B01D 35/046* (2013.01); *E03C 1/023* (2013.01); *E03C 1/0404* (2013.01); *E03C 1/0412* (2013.01); *C02F 2201/005* (2013.01); *C02F 2307/12* (2013.01); *E03C 2001/0415* (2013.01); *E03C 2201/30* (2013.01); *E03C 2201/40* (2013.01)

(58) Field of Classification Search
CPC ...... C02F 1/003; B01D 35/046; E03C 1/0412
See application file for complete search history.

(56) References Cited

U.S. PATENT DOCUMENTS

| | | | |
|---|---|---|---|
| 5,069,782 | A | 12/1991 | Moyher, Jr. et al. |
| 5,478,465 | A | 12/1995 | Larson et al. |
| 5,653,868 | A | 8/1997 | Yanou et al. |
| 5,744,033 | A | 4/1998 | Bertrand et al. |
| 6,179,130 | B1 | 1/2001 | Nguyen et al. |

(Continued)

FOREIGN PATENT DOCUMENTS

| | | |
|---|---|---|
| CN | 2677708 | 2/2005 |
| CN | 201858388 | 6/2011 |

(Continued)

OTHER PUBLICATIONS

International Search Report PCT Application No. PCT/US2016/53875, dated Dec. 27, 2016.

*Primary Examiner* — Kevin Lee
(74) *Attorney, Agent, or Firm* — Morrison & Foerster LLP

(57) ABSTRACT

A filtration system for a pull-down or pull-out faucet includes a multi-channel hose configured to fluidly couple to a spray head, a water filter configured to provide filtered water, and a diverter-equipped T-connector. The T-connector has a first branch configured to receive unfiltered water from a valve cartridge of the faucet, a second branch configured to receive filtered water from the water filter, and a third branch configured to deliver filtered and unfiltered water from the first and second branches to different channels of the multi-channel hose. The spray head also includes an activation switch configured to allow selective output of filtered and unfiltered water from the spray head.

22 Claims, 19 Drawing Sheets

(56) References Cited

U.S. PATENT DOCUMENTS

| | | |
|---|---|---|
| 6,368,503 B1 | 4/2002 | Williamson et al. |
| 6,571,962 B2 | 6/2003 | Thomas |
| 8,562,831 B2 | 10/2013 | Bors et al. |
| 8,877,057 B2 | 11/2014 | Wessels et al. |
| 8,925,571 B2 | 1/2015 | Li et al. |
| 9,004,290 B2 | 4/2015 | Tanner et al. |
| 2003/0010721 A1 | 1/2003 | Aldred et al. |
| 2006/0131228 A1 | 6/2006 | Truong |
| 2009/0014379 A1 | 1/2009 | Kwan et al. |
| 2009/0211654 A1 | 8/2009 | Nobili |
| 2012/0312401 A1 | 12/2012 | Gioira et al. |
| 2014/0230143 A1 | 8/2014 | Morales |
| 2016/0214041 A1 | 7/2016 | Miller et al. |
| 2016/0340207 A1* | 11/2016 | Schuster ................ C02F 1/008 |

FOREIGN PATENT DOCUMENTS

| | | |
|---|---|---|
| EP | 1342855 | 9/2003 |
| GB | 528910 | 11/1940 |
| GB | 2210283 | 6/1989 |
| TW | 201447149 | 12/2014 |
| WO | WO2015134887 A1 | 9/2015 |

\* cited by examiner

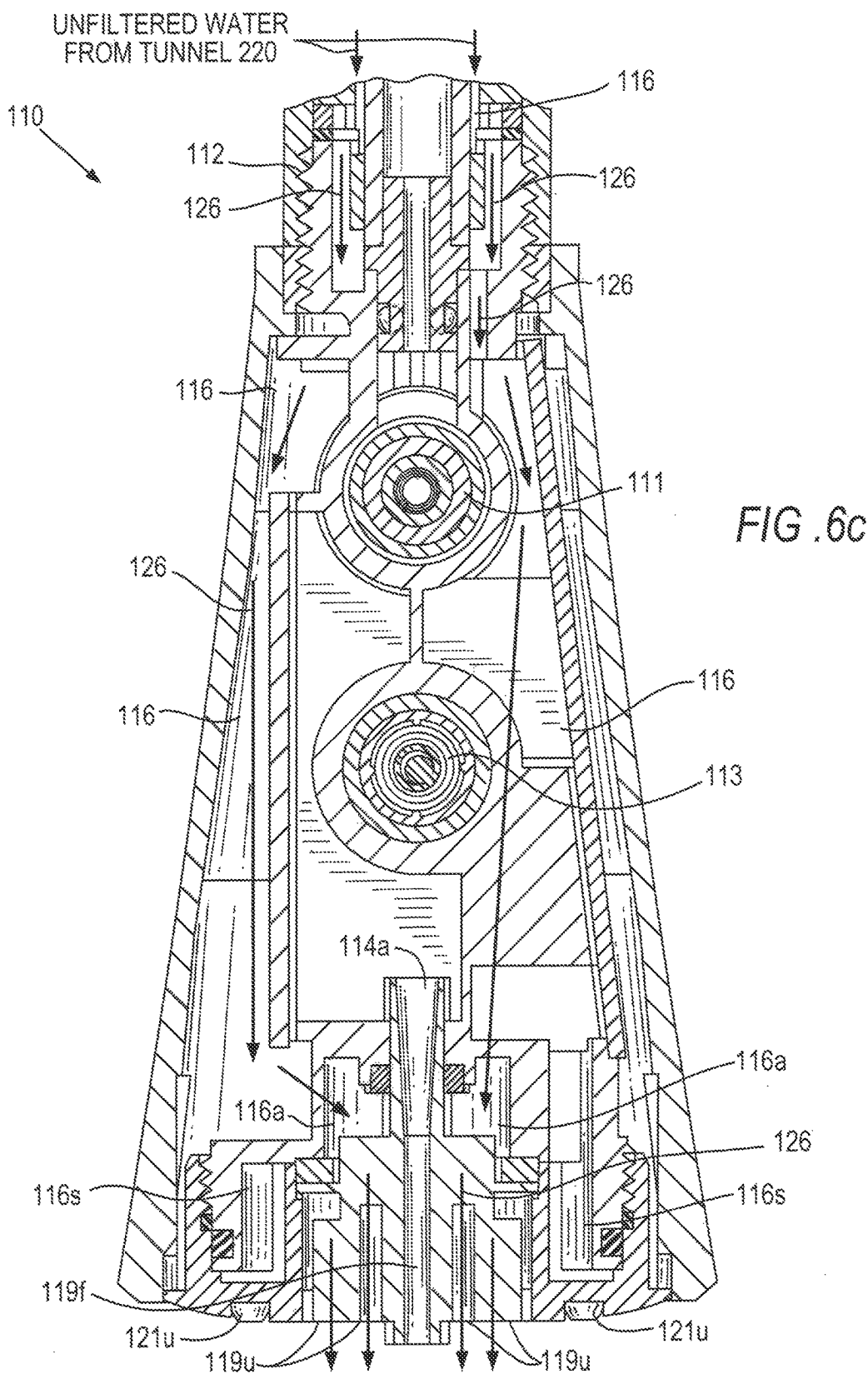

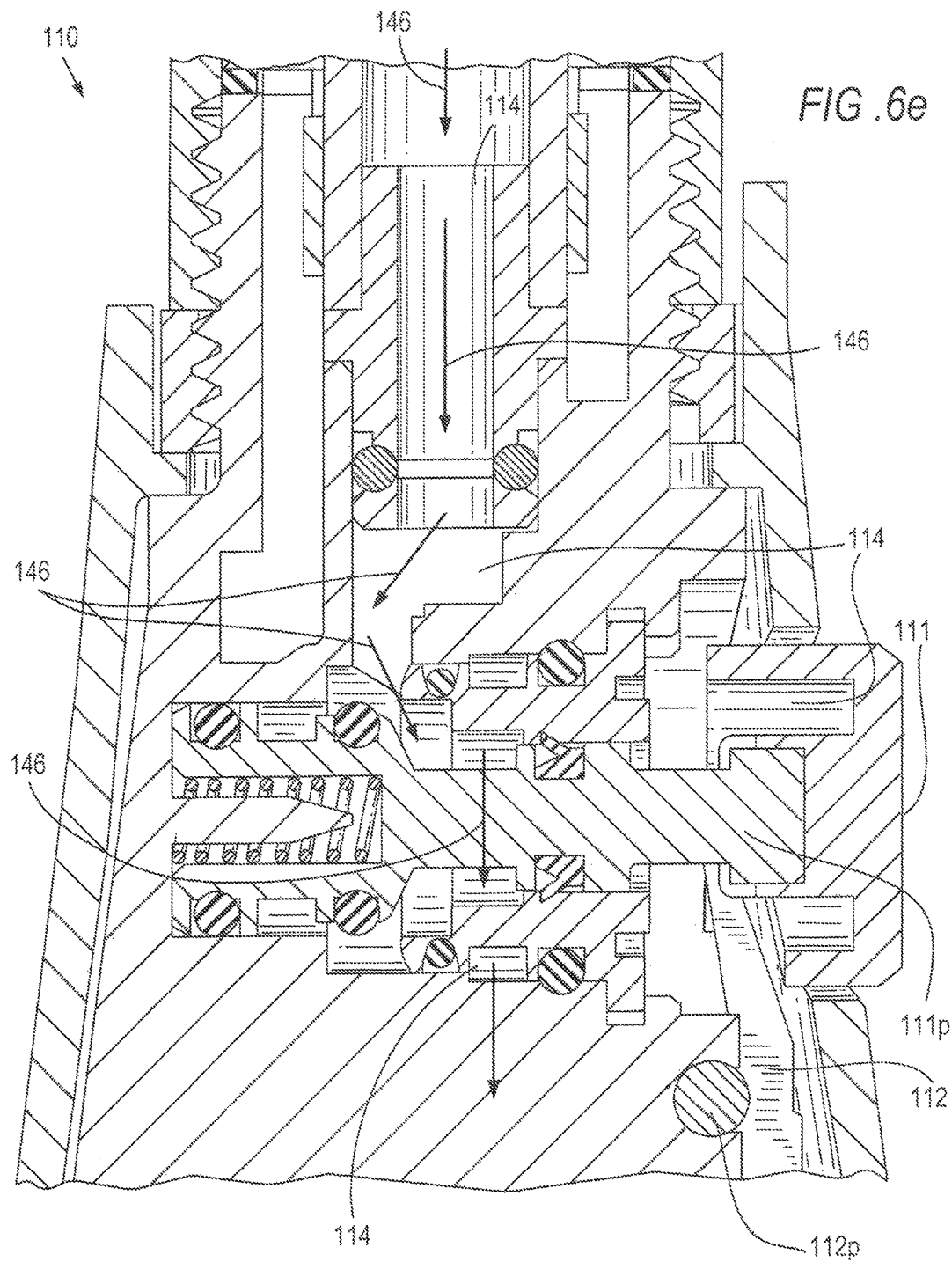

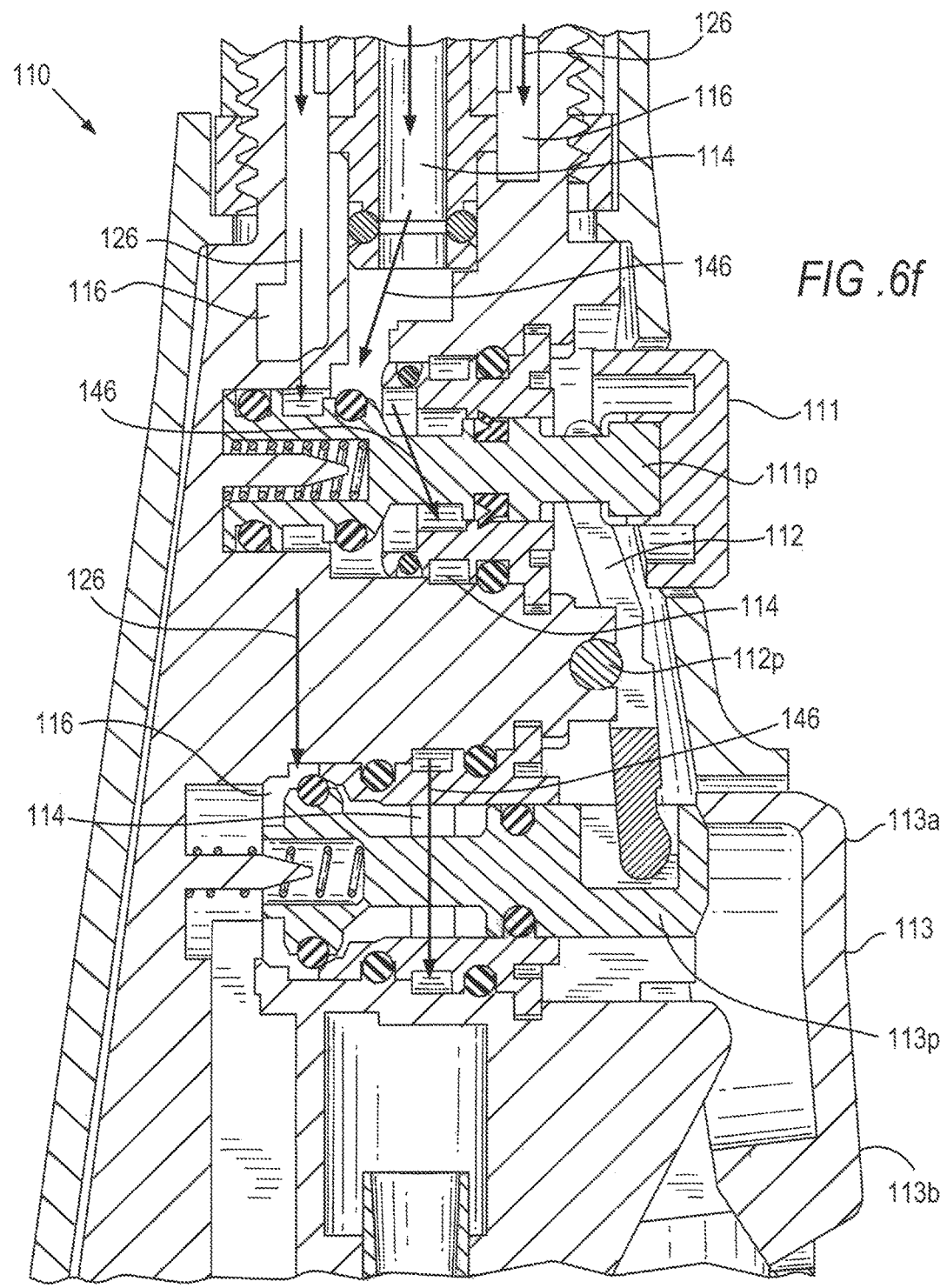

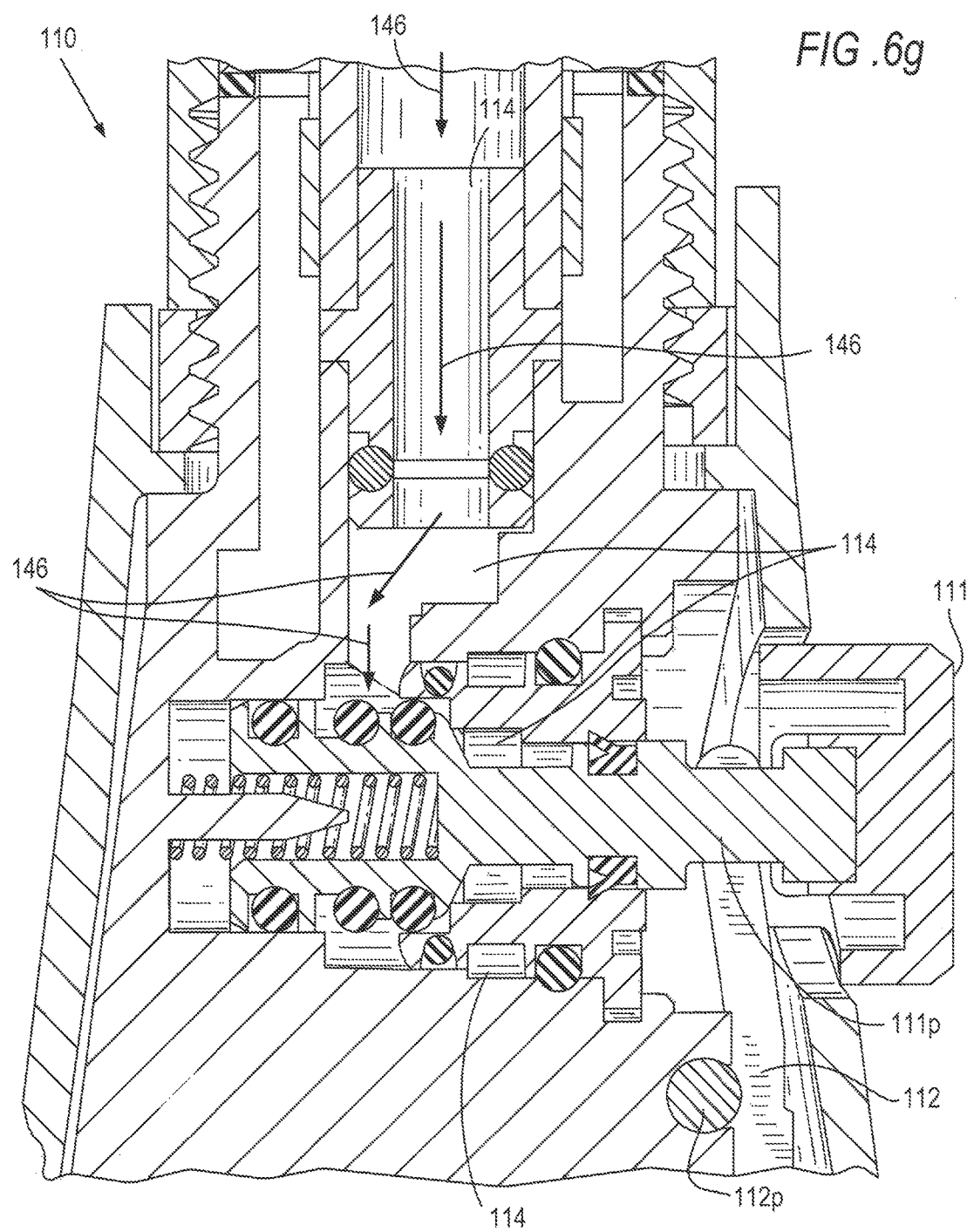

| ACTIVATION SWITCH 111 | ACTIVATION SWITCH 113 | SPRAY HEAD MODE |
|---|---|---|
| OFF (RESET) | AERATED | AERATED |
| OFF (RESET) | SHOWER SPRAY | SHOWER SPRAY |
| ON | OFF (RESET) | FILTERED WATER |

*FIG .6h*

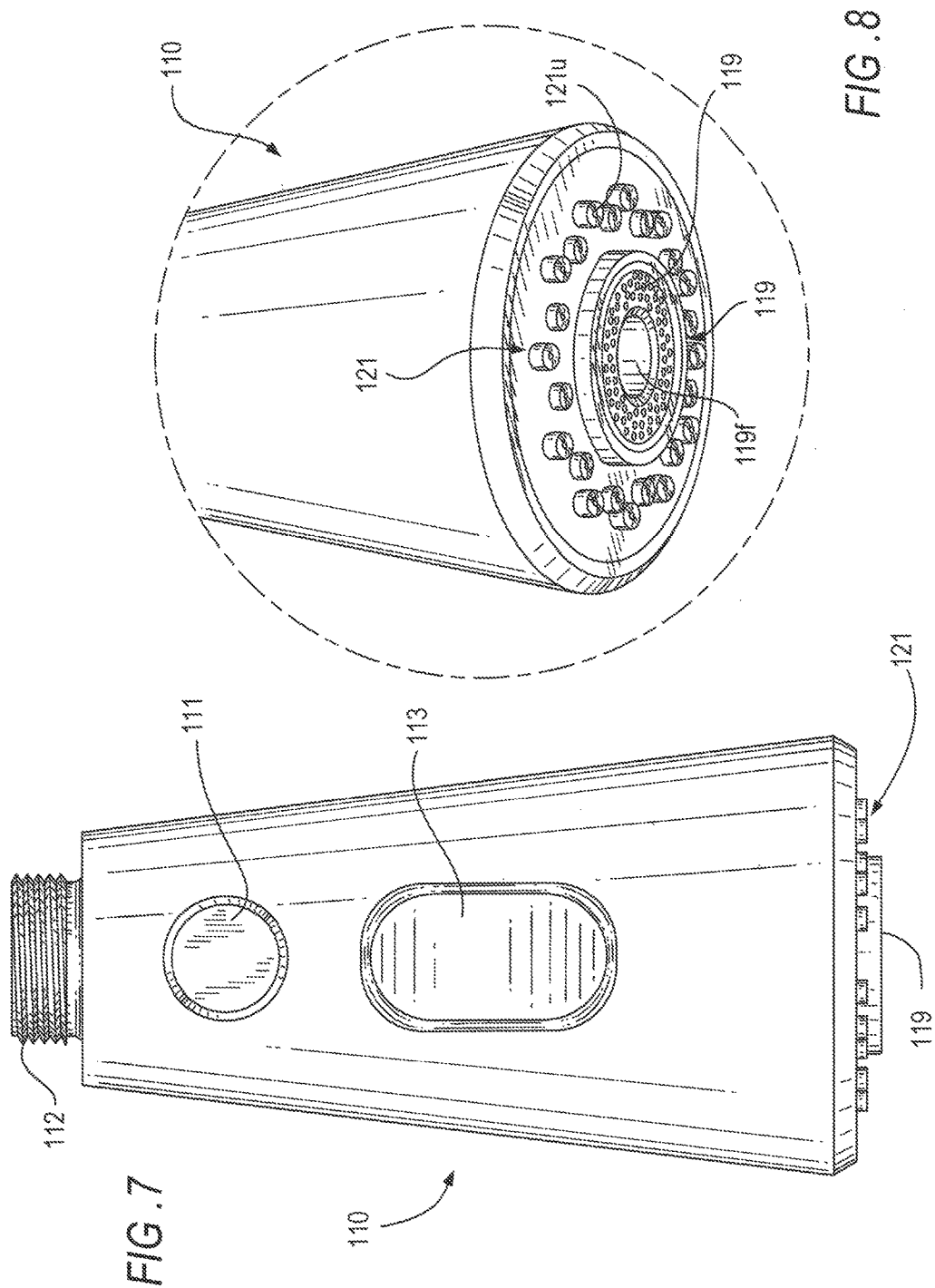

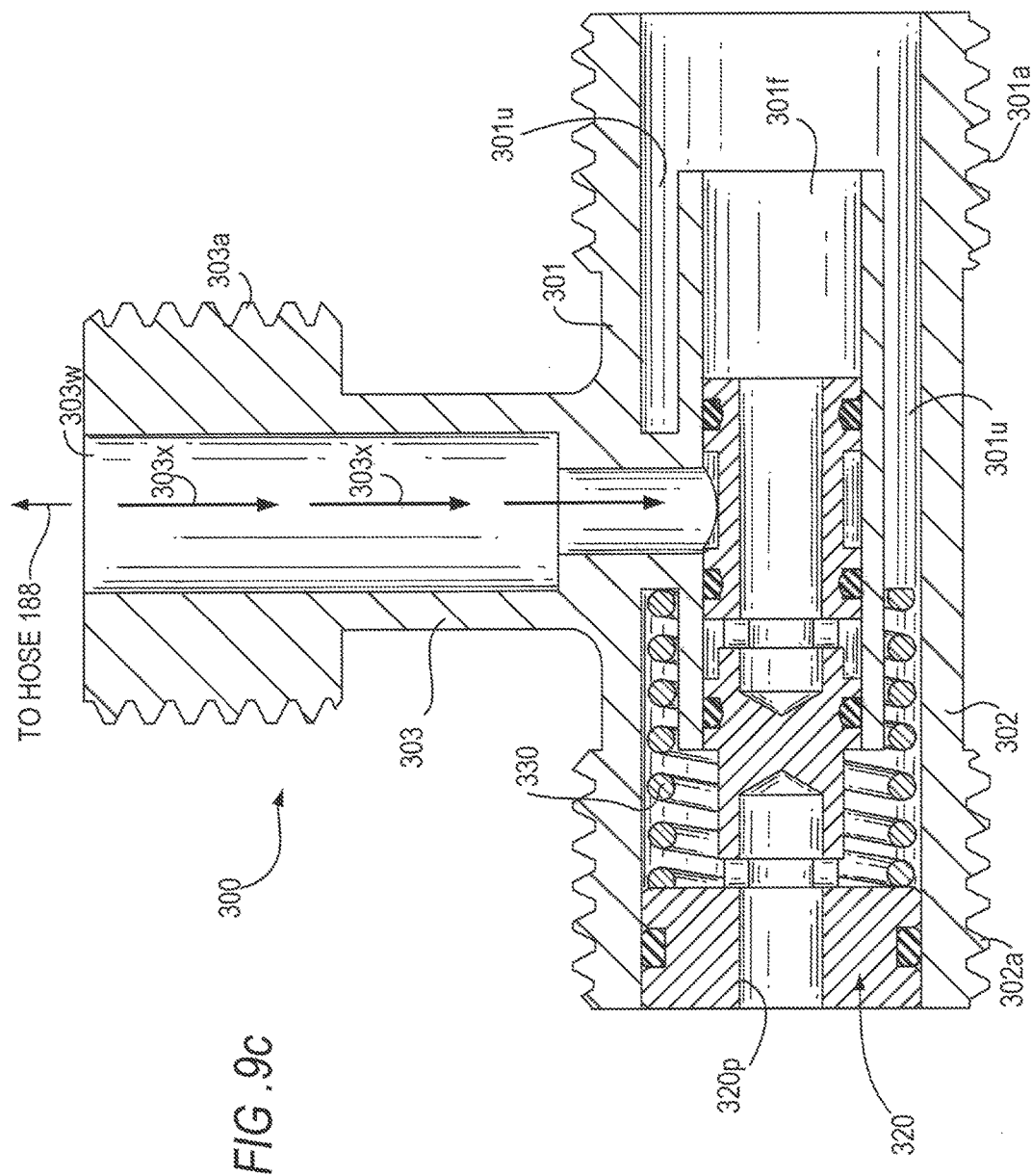

INTEGRATED FAUCET FILTRATION SYSTEM

CROSS-REFERENCE TO RELATED PROVISIONAL APPLICATION

This application claims the benefit of U.S. Provisional Application No. 62/238,910, filed on Oct. 8, 2015, the disclosure of which is hereby incorporated by reference herein in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to embodiments of a new plumbing fixture having both faucet and filtration assemblies.

BACKGROUND OF THE INVENTION

Faucets are ubiquitous plumbing products having the basic purpose of delivering hot, cold, or mixed water from a water supply (such as tap or well water) to a user. Some faucets, especially kitchen faucets, feature pull-down or pull-out spray mechanisms, which provide users with more flexibility in directing water output. Because tap and well water often include impurities, such as chlorine and other contaminants that could affect the taste, appearance, and safety quality of the water, people often choose to install water filtration devices to purify their water. However, conventional filter devices are either mounted at the faucet spout, which limits access to the sink, or under the sink deck and coupled to a side faucet separate from the main faucet, which occupies valuable deck real estate. These filter devices are also incompatible with pull-out faucet types.

SUMMARY OF THE INVENTION

Generally speaking, it is an object of the present invention to provide improved plumbing fixtures, particularly pull-out faucets, having integrated filtration assemblies that overcome the above-mentioned disadvantages associated with conventional faucet filtration devices.

According to an embodiment of the present invention, an integrated faucet filtration system includes a faucet assembly and a water filtration assembly. The faucet assembly includes a faucet body, a spout, a valve assembly, and a pull-out or pull-down spray head fluidly coupled to a multi-channel (e.g., 2-in-1) fluid hose running through the spout and body. The multi-channel hose can be made of flexible material that allows it to easily exit and enter the spout during pull-out and retraction of the spray head.

The valve assembly includes a cartridge, a manifold, a hot water supply hose, a cold water supply hose, a mixed tap water hose, and a Tee piece (i.e., T-connector) having a first branch fluidly connectable to a cold water source, a second branch fluidly coupled to an input end of the cold water supply hose, and a third branch fluidly coupled to an input of a filter assembly of the filtration assembly.

The multi-channel hose has two concentric layers. The interior layer provides a waterway for filtered water, and a tunnel between the interior layer and the exterior layer forms a waterway for unfiltered water. The spray head has complementary tunnels for receiving the filtered and unfiltered water from the multi-channel hose. These tunnels run from a reception portion of the spray head (which couples to the multi-channel hose), through the spray head, to complementary outlets of the spray head for separate dispensing of the two water types. According to one embodiment, the multi-channel hose includes a bonnet that couples to the to spray head's reception portion. The bonnet can include one or more sealing components that seal the connection between the multi-channel hose and the spray head.

The water filtration assembly includes the filter assembly (which includes a head and a body), a pressure regulator installed upstream of the filter assembly (e.g., for regulating the line pressure to optimize filter performance), connecting hoses, and a diverter-equipped Tee piece (diverter-equipped T-connector) located downstream of the filter assembly. The diverter-equipped T-connector includes a first branch fluidly coupled, via an outlet hose, to an output of the filter, a second branch fluidly coupled to an output end of the mixed tap water hose leading from the valve assembly, and a third branch fluidly coupled (via complementary tunnels) to the filtered and unfiltered waterways at an input end of the multi-channel fluid hose. The multi-channel hose includes another bonnet that couples to the third branch of the diverter-equipped T-connector (e.g., in a manner similar to that of the connection between the multi-channel hose and the spray head).

The diverter-equipped T-connector includes complementary waterways for passing filtered water (output by the filter assembly) and unfiltered water (from the mixed tap water hose). The diverting mechanism consists of a spring preloaded piston that interacts with the valve assembly cartridge, and can occupy open and closed states. When the cartridge is closed, pressure of the filtered water is unable to overcome the spring force, the piston blocks both filtered and unfiltered water from entering the respective waterways in the diverter-equipped T-connector, and no water is output therefrom. When the cartridge is open, pressure in the mixed tap water hose (as well as from the filtered water) overcomes the spring force and pushes the piston, opening the two waterways in the diverter-equipped T-connector for to passage of both filtered and unfiltered water into the multi-channel hose.

According to one embodiment, the spray head is equipped with the filtered water outlet and two separate outlets for unfiltered water—an aerated outlet and a shower outlet. The spray head includes a switch (e.g., a toggle switch positioned on either a front, back, or side portion of the spray head) that selectively diverts discharge of unfiltered water between the aerated outlet and the shower outlet. The spray head additionally, or alternatively, includes a switch (e.g., a button, lever, knob, or the like) that controls output of filtered water from the spray head. The two switches can interact (e.g., via one or more interface components) such that the two types of water cannot be simultaneously output. In one embodiment, both filtered and unfiltered water (from the diverter-equipped T-connector) may be continually present in the spray head, and the switch only controls output of the two types of water from the spray head.

Still other objects and advantages of the present invention will in part be obvious and will in part be apparent from the disclosure.

The present invention accordingly comprises the features of construction, combinations of elements, and arrangement of parts, all as exemplified in the constructions herein set forth, and the scope of the invention will be indicated in the claims.

BRIEF DESCRIPTION OF THE DRAWINGS

The present invention is discussed in greater detail below with reference to exemplary embodiments illustrated in the accompanying drawings, in which:

FIGS. 6b and 6c are front cross-sectional views of the spray head embodiment of FIG. 6a, illustrating unfiltered water travel paths in aerated and shower spray modes of the spray head;

FIG. 6e is a partial cross-sectional view of the spray head embodiment of FIGS. 6a-6d, illustrating a portion of the filtered water travel path in the filtered water output mode;

FIG. 6f is a partial cross-sectional view of the spray head embodiment of FIGS. 6a-6e, illustrating a cutoff of the unfiltered water travel path when the spray head is in the filtered water output mode;

FIG. 6g is a partial cross-sectional view of the spray head embodiment of FIGS. 6a-6f, illustrating a cutoff of the filtered water travel path when the spray head is in either the aerated or shower spray modes;

FIG. 6h is a table illustrating the various states of a filtered water activation switch and an unfiltered water output selection switch and corresponding water output modes of the spray head embodiment shown in FIGS. 6a-6g;

FIGS. 7 and 8 are front and partial front views of a spray head, in accordance with an embodiment of the present invention;

FIG. 9b is an exploded view of the multi-channel hose and diverter-equipped T-connector embodiment shown in FIG. 9a;

FIGS. 9c and 9d are cross-sectional views of the diverter-equipped T-connector embodiment shown in FIGS. 9a and 9b, illustrating the T-connector in closed and open states.

DETAILED DESCRIPTION OF THE PREFERRED EMBODIMENTS

Figure 1:
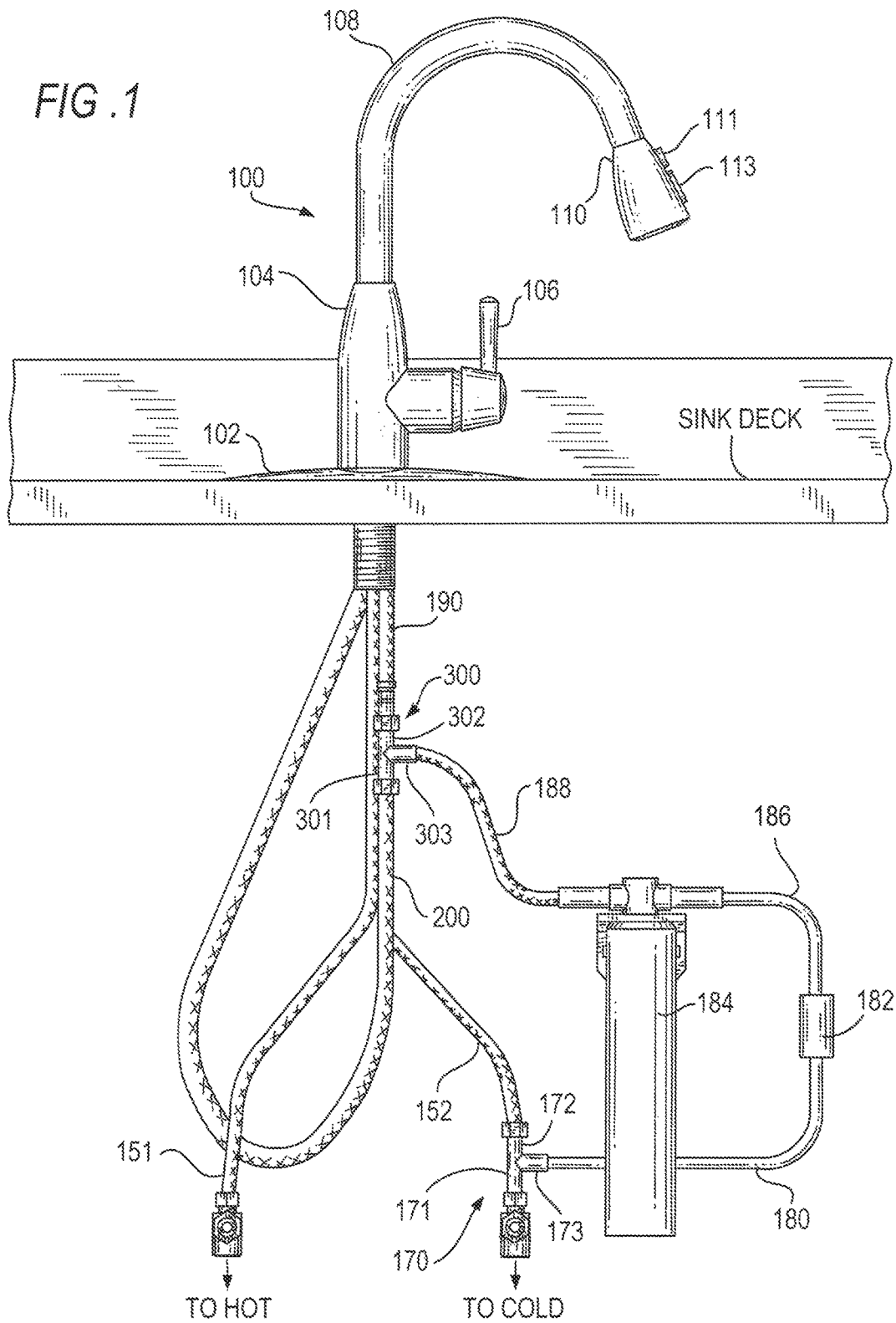
FIG. 1 is a front view of an exemplary faucet having an integrated filtration system, in accordance with an embodiment of the present invention.
Figure 2:
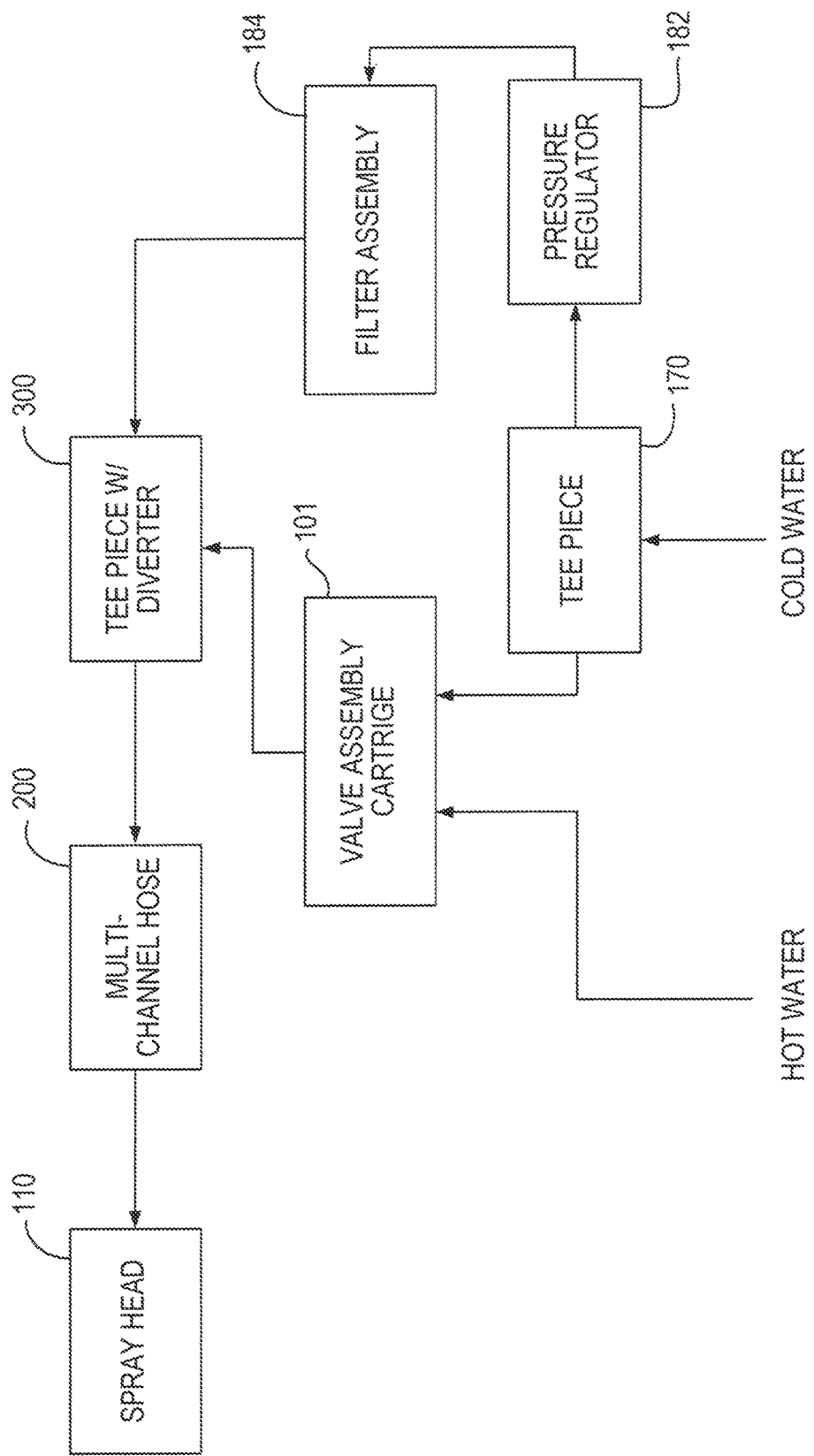
FIG. 2 is a schematic diagram illustrating the flow of filtered and unfiltered water in an integrated faucet filtration system, in accordance with an embodiment of the present invention.

FIG. 1 is a front view of an exemplary faucet 100 having an integrated filtration system. FIG. 2 is a schematic diagram illustrating the flow of filtered and unfiltered water in the integrated faucet filtration system. Faucet 100 includes a supporting base 102 that rests on a sink deck, a faucet body 104 disposed on the supporting base 102, a handle 106 for controlling water output, a spout 108 mechanically coupled to body 104, and a spray head 110 fluidly coupled to one end of a multi-channel hose 200 that is at least partially disposed in the spout. Spray head 110 includes a filtered water activation switch 111 and an unfiltered water output selection switch 113. Multi-channel hose 200 runs through spout 108, body 104, supporting base 102, and the sink deck, and is fluidly coupled, at its other end, to a branch 301 of a diverter-equipped T-connector 300. A hot water supply hose 151 is fluidly coupled between a hot water source and a valve assembly cartridge 101 disposed in body 104. A branch 171 of a T-connector 170 is coupled to a cold water source, a branch 172 is coupled to a cold water supply hose 152 that leads to valve assembly cartridge 101, and a branch 173 is coupled to a hose 180 leading to a pressure regulator 182. Pressure regulator 182 is, in turn, fluidly coupled to a filter assembly 184 via a hose 186. Filter assembly 184 can employ any material suitable for purifying water (e.g., activated carbon microfilters). Pressure regulator 182 is configured to regulate the cold water pressure leading into filter assembly 184 to optimize filter performance.

A mixed water hose 190 is fluidly coupled between valve assembly cartridge 101 and a branch 302 of diverter-equipped T-connector 300. A branch 303 of diverter-equipped T-connector 300 is coupled to filter assembly 184 via a hose 188. As illustrated in FIGS. 1 and 2, unfiltered hot water from the hot water source is delivered to valve assembly cartridge 101 via hot water supply hose 151. Unfiltered cold water from the cold water source is delivered to T-connector 170 and subsequently delivered to pressure regulator 182 via hose 180 and to valve assembly cartridge 101 via cold water supply hose 152. Filtered water output by filter assembly 184 is delivered to diverter-equipped T-connector 300 via hose 188. Unfiltered hot and cold water is mixed in valve assembly cartridge 101 (e.g., according to the position of handle 106) and delivered to diverter-equipped T-connector 300 via the mixed water hose 190. The filtered and unfiltered water is then finally delivered from diverter-equipped T-connector 300 to spray head 110 via multi-channel hose 200.

Figure 3:
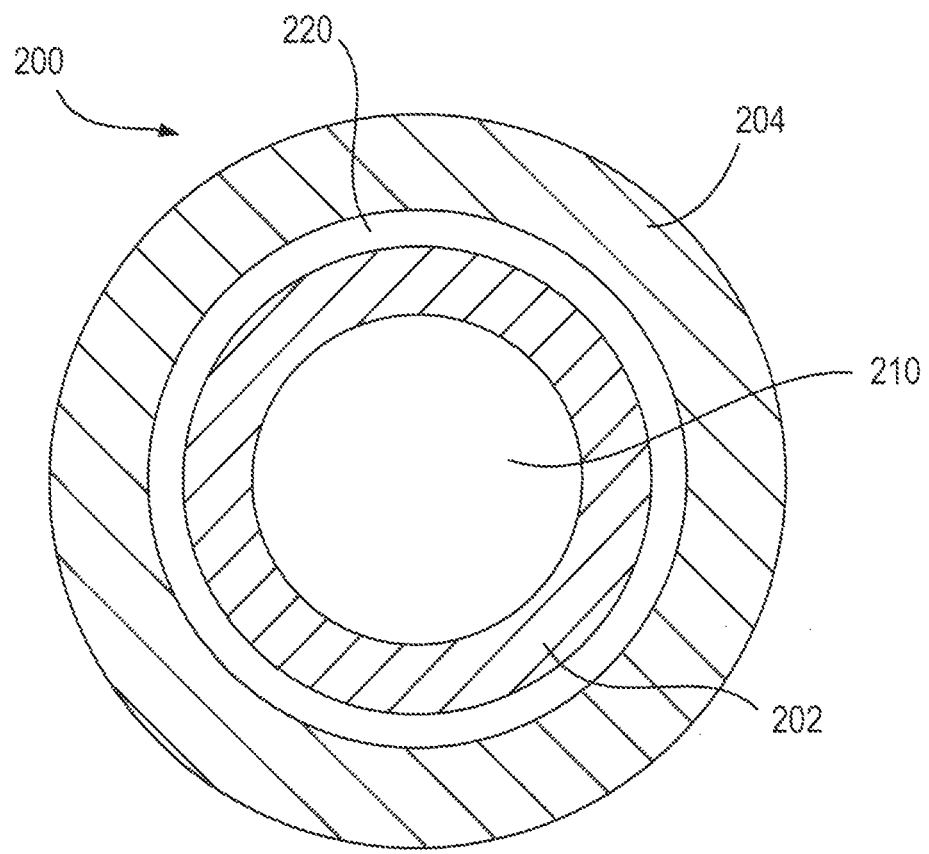
FIG. 3 is a cross-sectional view of the multi-channel hose, in accordance with an embodiment of the present invention.

FIG. 3 is a cross-sectional view of multi-channel hose 200. Multi-channel hose 200 can be composed of flexible, lightweight material, and includes two concentric layers—an interior layer 202 and an exterior layer 204. Interior layer 202 provides a tunnel 210 that serves as a waterway for filtered water, and a tunnel 220 between interior layer 202 and exterior layer 204 forms a waterway for unfiltered water.

Figure 4:
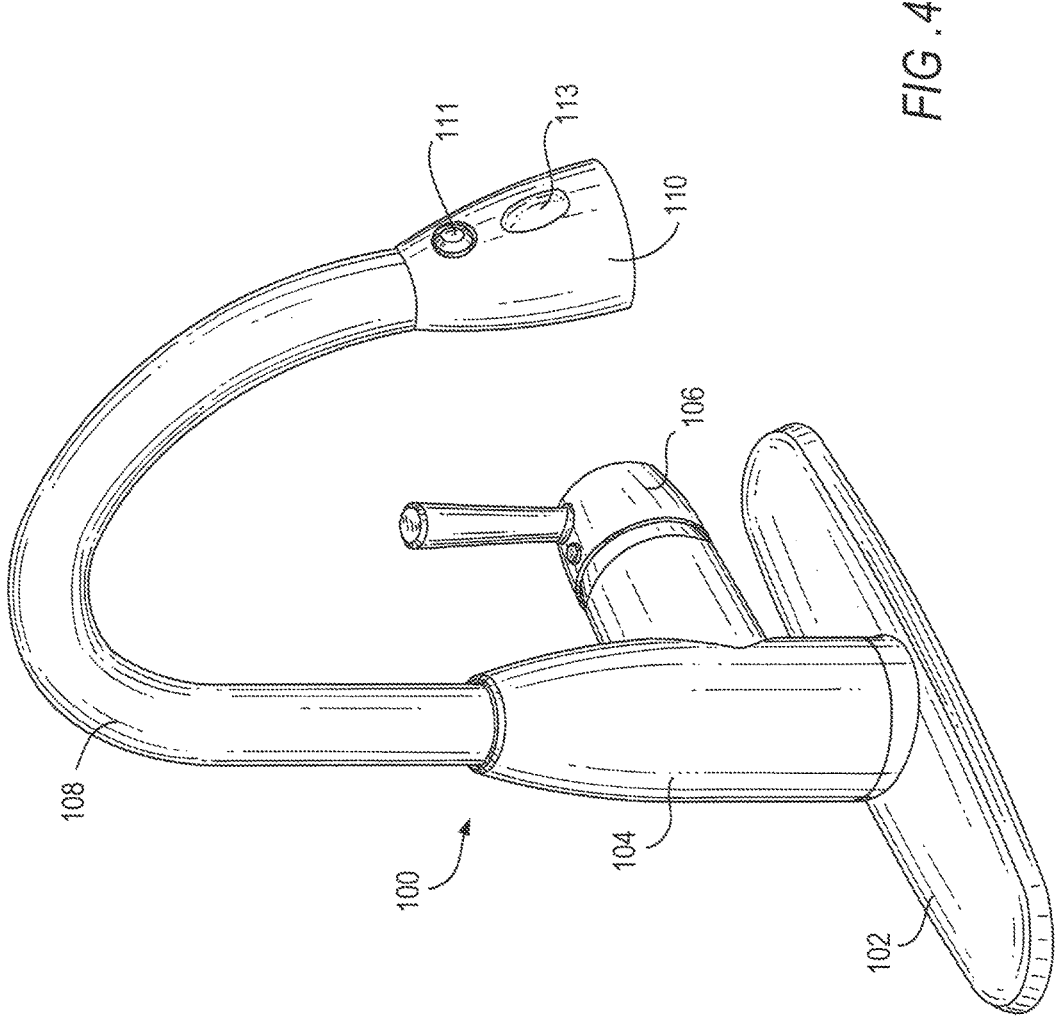
FIGS. 4 and 5 are perspective views of a faucet illustrating a spray head in docked and undocked positions, in accordance with an embodiment of the present invention.
Figure 5:
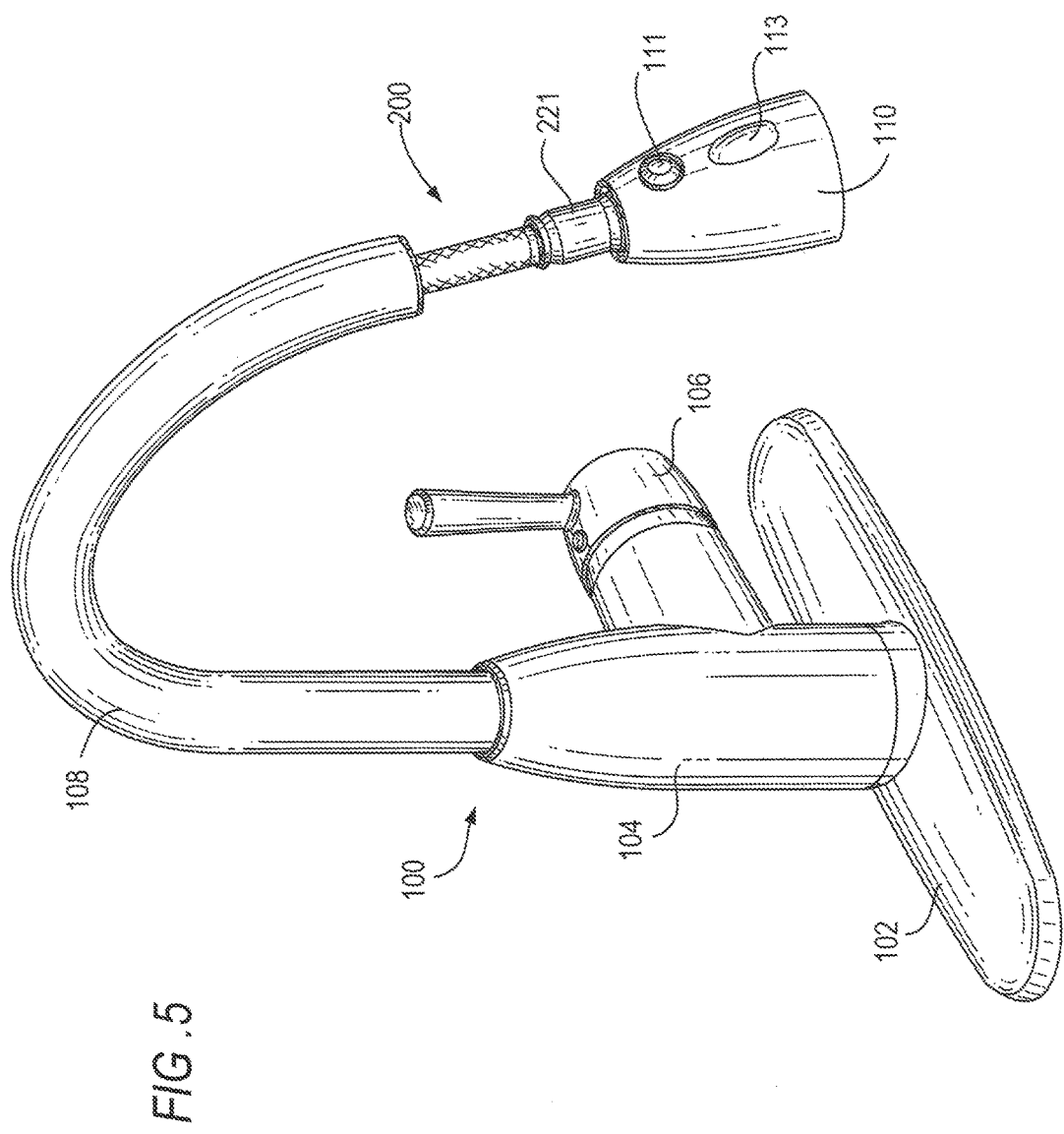
Figure 6A:
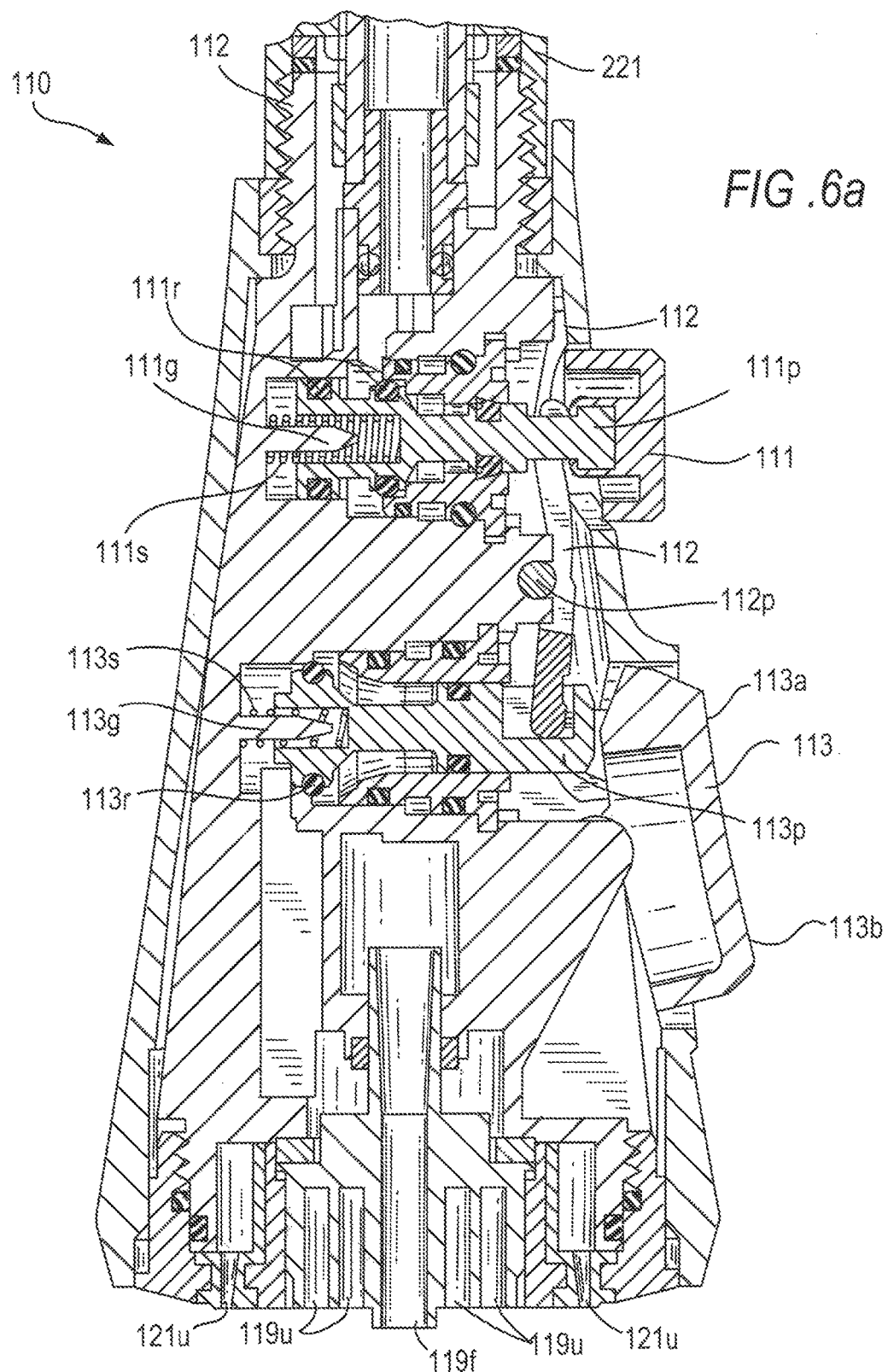
FIG. 6a is a side cross-sectional view of a spray head, in accordance with an embodiment of the present invention.
Figure 6B:
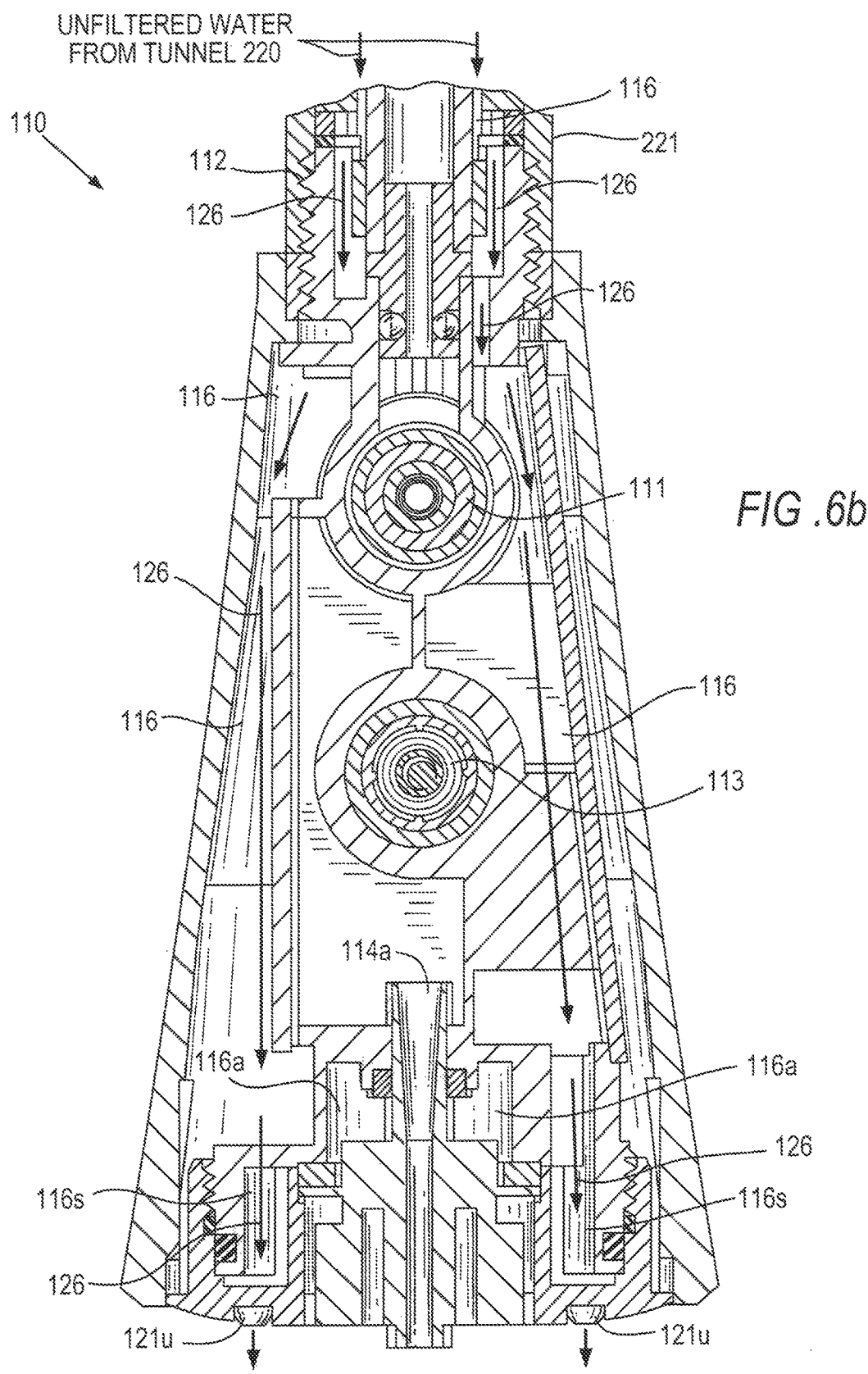
Figure 6D:
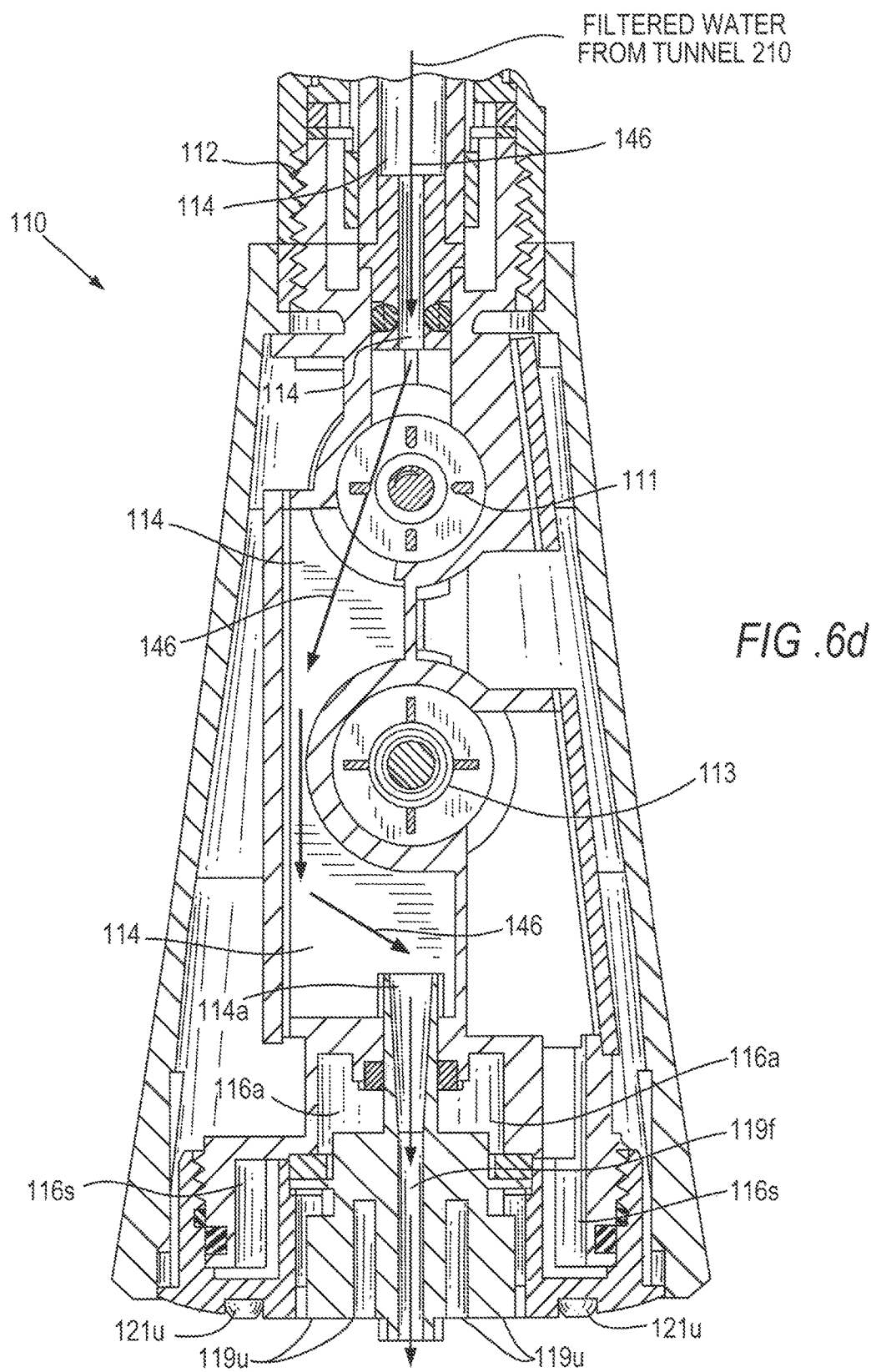
FIG. 6d is a front cross-sectional view of the spray head embodiment of FIGS. 6a-6c, illustrating the filtered water travel path in the filtered water output mode of the spray head.

FIGS. 4 and 5 are perspective views of faucet 100, illustrating spray head 110 in docked and undocked positions. FIG. 6a is a side cross-sectional view of spray head 110. FIGS. 6b and 6c are front cross-sectional views of spray head 110, illustrating unfiltered water travel paths in aerated and shower spray modes of spray head 110. FIG. 6d is a front cross-sectional view of spray head 110, illustrating the filtered water travel path in the filtered water output mode of spray head 110. FIG. 6e is a partial cross-sectional view of spray head 110, illustrating a portion of the filtered water travel path in the filtered water output mode. FIG. 6f is a partial cross-sectional view of spray head 110, illustrating a cutoff of the unfiltered water travel path when spray head 110 is in the filtered water output mode. FIG. 6g is a partial cross-sectional view of spray head 110, illustrating a cutoff of the filtered water travel path when spray head 110 is in either the aerated or shower spray modes. FIG. 6h is a table illustrating the various states of filtered water activation switch 111 and unfiltered water output selection switch 113 and the corresponding water output modes of spray head 110. FIGS. 7 and 8 are front and partial front views of spray head 110.

Spray head 110 includes water pathways 114 and 116 for receiving filtered and unfiltered water from respective tunnels 210 and 220 of multi-channel hose 200. Water pathways 114 and 116 run internally in spray head 110, from a threaded coupler 112 of spray head 110 to complementary outlet components—an aerator 119 and a shower spray outlet 121—of spray head 110 that dispense the two types of water. Multi-channel hose 200 includes a bonnet 221 (e.g., attached to an end of multi-channel hose 200) having complementary threads for coupling to threaded coupler 112. One or more sealing components are also included for sealing the connection between bonnet 221 and threaded coupler 112 to prevent water leakage.

Aerator 119 is centrally disposed at an output end of spray head 110 and includes multiple aerator outlets 119u for outputting unfiltered water. Outlets 119u are arranged to circumscribe a separate and distinct filtered water outlet 119f of aerator 119. Shower spray outlet 121 is also disposed at the output end of spray head 110 and includes multiple spray nozzles 121u for outputting unfiltered water. Nozzles 121u are arranged to generally circumscribe aerator 119.

Filtered water activation switch 111 and unfiltered water output selection switch 113 can be manipulated to regulate the passage of filtered and unfiltered water through water pathways 114 and 116. As illustrated in FIGS. 6a and 6e-6g, activation switch 111 is coupled to a piston sub-assembly including a piston 111p, sealing O-rings 111r, and a spring 111s positioned over a guide pin 111g. Actuation of activation switch 111 (e.g., by depressing activation switch 111 into spray head 110) switches spray head 110 to the filtered water output mode. In at least one embodiment, activation switch 111 is a spring-loaded push button that can be released from a depressed state upon subsequent depression of the button.

Selection switch 113 is similarly coupled to a piston sub-assembly including a piston 113p, sealing O-rings 113r, and a spring 113s positioned over a guide pin 113g. Actuation of an upper portion 113a of selection switch 113 (e.g., by depressing upper portion 113a into spray head 110) switches spray head 110 to the unfiltered water shower spray mode. Actuation of a lower portion 113b of selection switch 113 (e.g., by depressing lower portion 113b into spray head 110) switches spray head 110 to the unfiltered water aerated mode.

Switching between the filtered water output mode and any of the unfiltered water output modes is achieved via a lever 112 coupled between pistons 111p and 113p. Lever 112 is pivotable about a point 112p and includes an upper end that interacts with piston 111p and/or activation switch 111 and a lower end that interacts with piston 113p and/or selection switch 113. When activation switch 111 is in a depressed state (and spray head 110 is in the filtered water output mode), subsequent depression of selection switch 113 (e.g., at upper portion 113a or lower portion 113b) causes lever 112 to rotate in a clockwise direction and drive activation switch 111 from the depressed state to an undepressed (e.g., neutral or reset) state. This switches spray head 110 from the filtered water output mode to either the unfiltered water aerated mode or the unfiltered water shower spray mode, depending on which portion of selection switch 113 is depressed. Conversely, when selection switch 113 is in a depressed state (e.g., when upper portion 113a is in a depressed state, with spray head 110 in the unfiltered water shower spray mode, or when lower portion 113b is in a depressed state, with spray head 110 in the unfiltered water aerated mode), subsequent depression of activation switch 111 causes lever 112 to rotate in a counter-clockwise direction and drive selection switch 113 from its depressed state to an undepressed (e.g., neutral or reset) state. This switches spray head 110 from the unfiltered water (aerated or shower spray) mode to the filtered water output mode.

It is to be understood that selection switch 113 (and its associated components) can alternatively be configured to set spray head 110 to the unfiltered water aerated mode when upper portion 113a is depressed and to the unfiltered water shower spray mode when lower portion 113b is depressed.

FIGS. 6b and 6c respectively illustrate the unfiltered water travel paths (represented by arrows 126) in shower spray and aerated spray modes of spray head 110. FIG. 6d illustrates the filtered water travel path (represented by arrows 146) in the filtered water output mode.

When selection switch 113 is depressed at upper portion 113a, unfiltered water is diverted to a channel 116s of pathway 116 for output via nozzles 121u of shower spray outlet 121 (FIG. 6b). When selection switch 113 is depressed at lower portion 113b, unfiltered water in unfiltered water pathway 116 is diverted to a channel 116a of pathway 116 for output via outlets 119u of aerator 119 (FIG. 6c). Diversion between the shower spray and aerated modes is achieved via one or more components of (or coupled to) selection switch 113, such as one or more movable arms of selection switch 113. The component(s) prevents unfiltered water in unfiltered water pathway 116 from entering channel 116a when upper portion 113a is depressed, and prevents unfiltered water in unfiltered water pathway 116 from entering channel 116s when lower portion 113b is depressed. In either case, any filtered water that might be present in filtered water pathway 114 is prevented (e.g., by piston 111p) from entering a channel 114a of pathway 114 for output via filtered water outlet 119f of aerator 119 (FIG. 6g).

When activation switch 111 is set to a first state (e.g., a depressed state), filtered water in filtered water pathway 114 is delivered to channel 114a for output via filtered water outlet 119f (FIGS. 6d and 6e). In this case, any unfiltered water that might be present in unfiltered water pathway 116 is prevented (e.g., by piston 113p) from entering any of channel 116a, outlets 119a, channel 116s, and shower spray nozzles 121u (FIG. 6f). When activation switch 111 is switched from a depressed state to an undepressed (e.g., reset, neutral, or released) state, such as, for example, by depression of selection switch 113), unfiltered water is permitted to enter either channel 116a (for output via outlets 119u) or channel 116s (for output via nozzles 121u), depending on which portion of selection switch 113 is depressed, and filtered water in filtered water pathway 114 is prevented from entering channel 114a for output via filtered water outlet 119f (FIG. 6g).

Figure 9A:
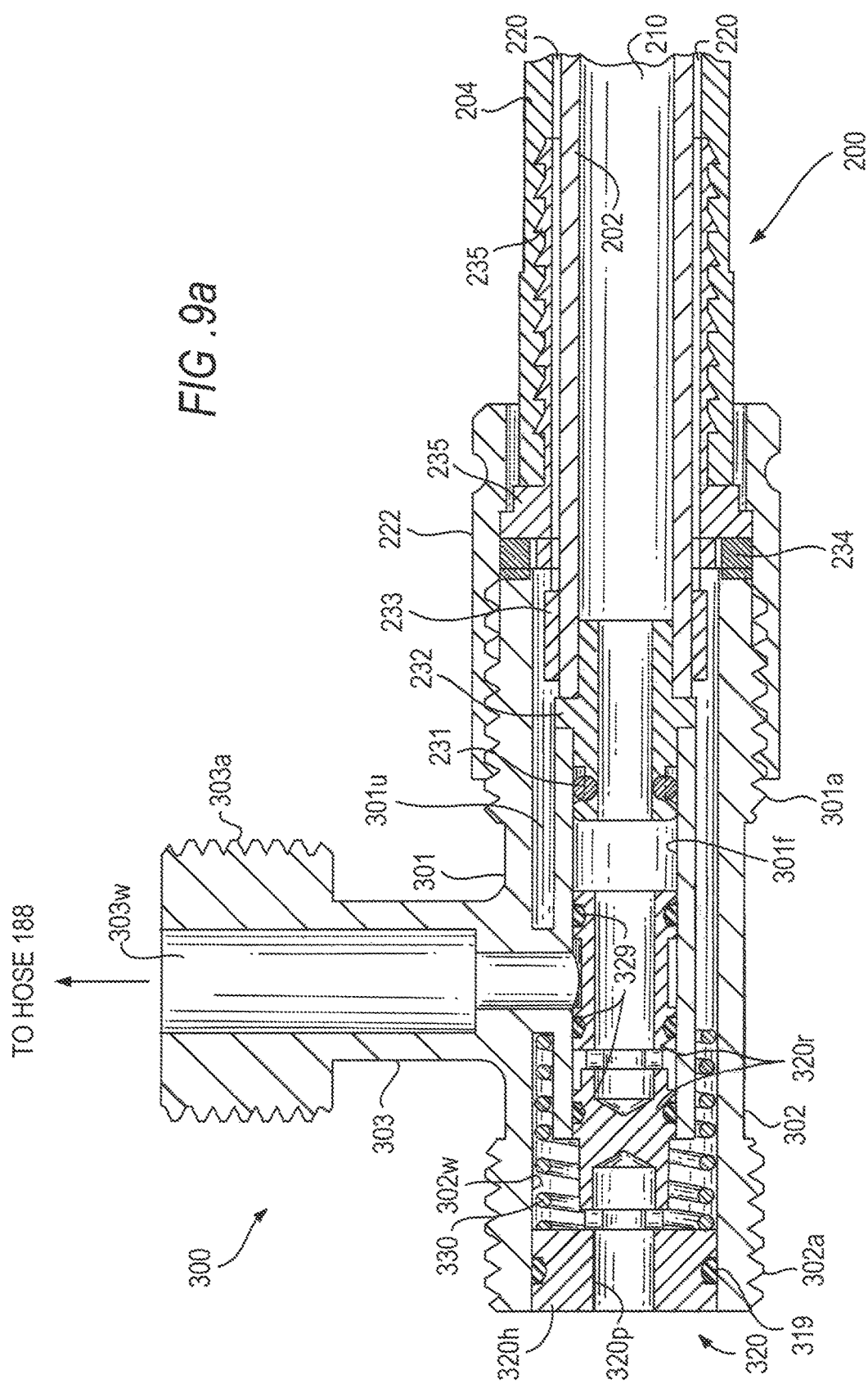
FIG. 9a is a cross-sectional view of a multi-channel hose coupled to a diverter-equipped T-connector in a closed state, in accordance with an embodiment of the present invention.
Figure 9B:
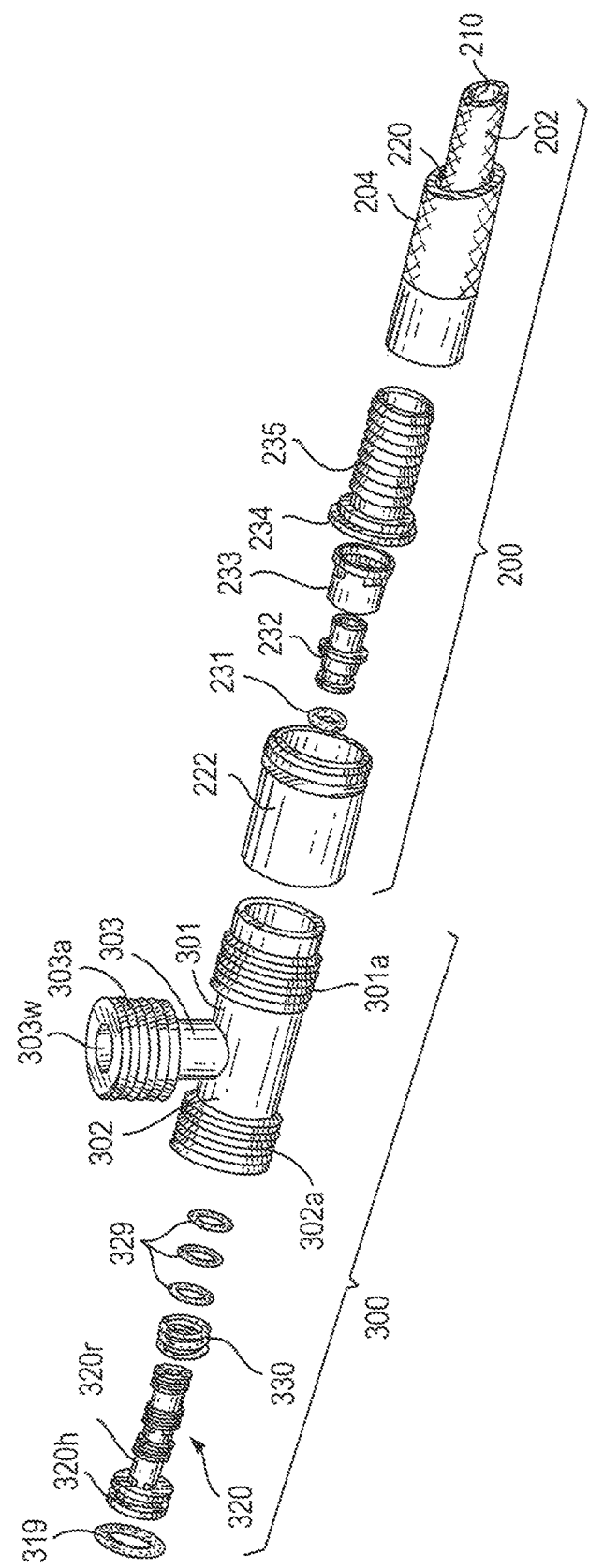
Figure 9D:
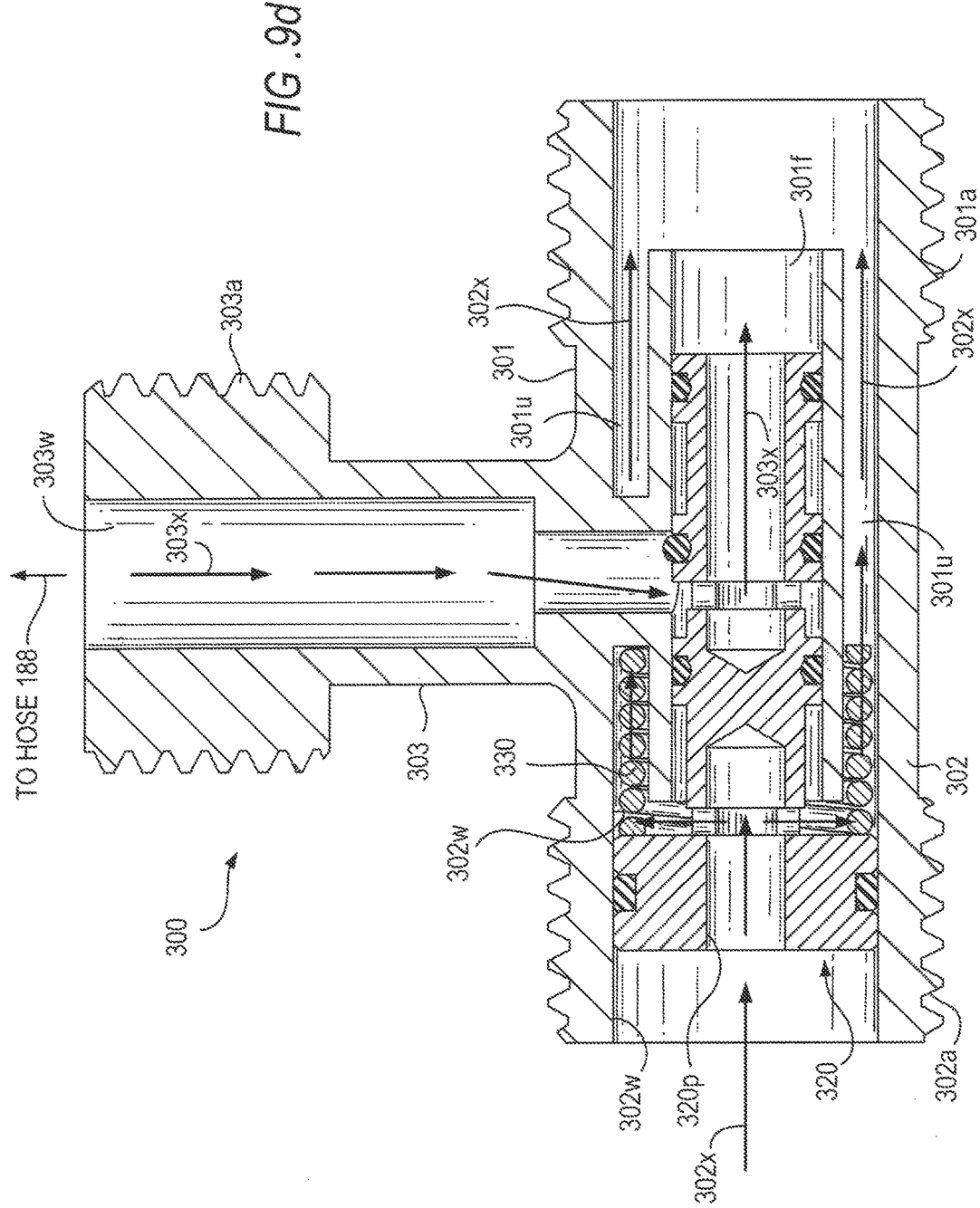

FIG. 9a is a cross-sectional view of multi-channel hose 200 coupled to diverter-equipped T-connector 300 in a closed state. FIG. 9b is an exploded view of multi-channel hose 200 and diverter-equipped T-connector 300. FIGS. 9c and 9d are cross-sectional views of diverter-equipped T-connector 300 in closed and open states. Each of branches 301-303 includes a threaded coupling head (threaded coupling heads 301a, 302a, and 303a) for threaded and fluid coupling to a corresponding one of hoses 188, 190, and multi-channel hose 200. Branch 303 includes a filtered waterway 303w for passing filtered water received from hose 188. Branch 302 includes an unfiltered waterway 302w for passing unfiltered water from mixed water hose 190. Branch 301 includes a filtered water path 301f that complementarily couples to filtered water tunnel 210 of multi-channel hose 200, and an unfiltered water path 301u that complementarily couples to unfiltered water tunnel 220 of multi-channel hose 200.

As shown in FIGS. 9a and 9b, multi-channel hose 200 includes a bonnet 222 that threadably and fluidly couples to threaded coupling head 301a of branch 301. Hose 200 also includes a washer (that may, e.g., be composed of rubber or the like) for sealing waterway connections between hose 200 and branch 301, as well as an O-ring 231, an adapter 232, a ferrule 233, a washer 234, and a barb 235 that form and/or seal the water connections between hose 200 and branch 301 when assembled.

The diverting mechanism of diverter-equipped T-connector 300 includes a piston 320 having a head 320h and a rod 320r. Piston 320 is preloaded by a spring 330 and sealed at head 320h and rod 320r by O-rings 319 and 329. In the closed state of diverter-equipped T-connector 300 (e.g., when cartridge 101 is closed), no unfiltered water is delivered to branch 302, and pressure of the filtered water in waterway 303w (represented by arrows 303x) is unable to overcome the spring force (FIG. 9c). In this scenario, piston 320 remains preloaded as shown in FIGS. 9a and 9c (i.e., with head 320h being disposed proximate an open end of branch 302 and rod 320r of piston 320 being positioned so as to block the filtered water in waterway 303w from entering filtered water path 301f), and no water (filtered or unfiltered) is output to multi-channel hose 200. In the open state of diverter-equipped T-connector 300 (e.g., when cartridge 101 is open), unfiltered water is delivered from mixed water hose 190 to branch 302, pressure of the unfiltered water (represented by arrows 302x) drives head 320h of piston 320 rightward and enters passageway 320p in head 320h into waterway 302w on the opposite side of head 320h, and the filtered water in waterway 303w (represented by arrows 303x) enters an opening in piston 320 (FIG. 9d). The filtered and unfiltered water respectively flow into filtered and unfiltered water paths 301f and 301u for output to multi-channel hose 200. When cartridge 101 is subsequently closed, no unfiltered water is delivered to branch 302, and spring 330 returns piston 320 to its closed position.

It is to be understood that, in the open state of diverter-equipped T-connector 300, either the pressure of the unfiltered water alone, or the combination of the pressure of both the unfiltered and filtered water, overcomes the spring force.

Figure 10:
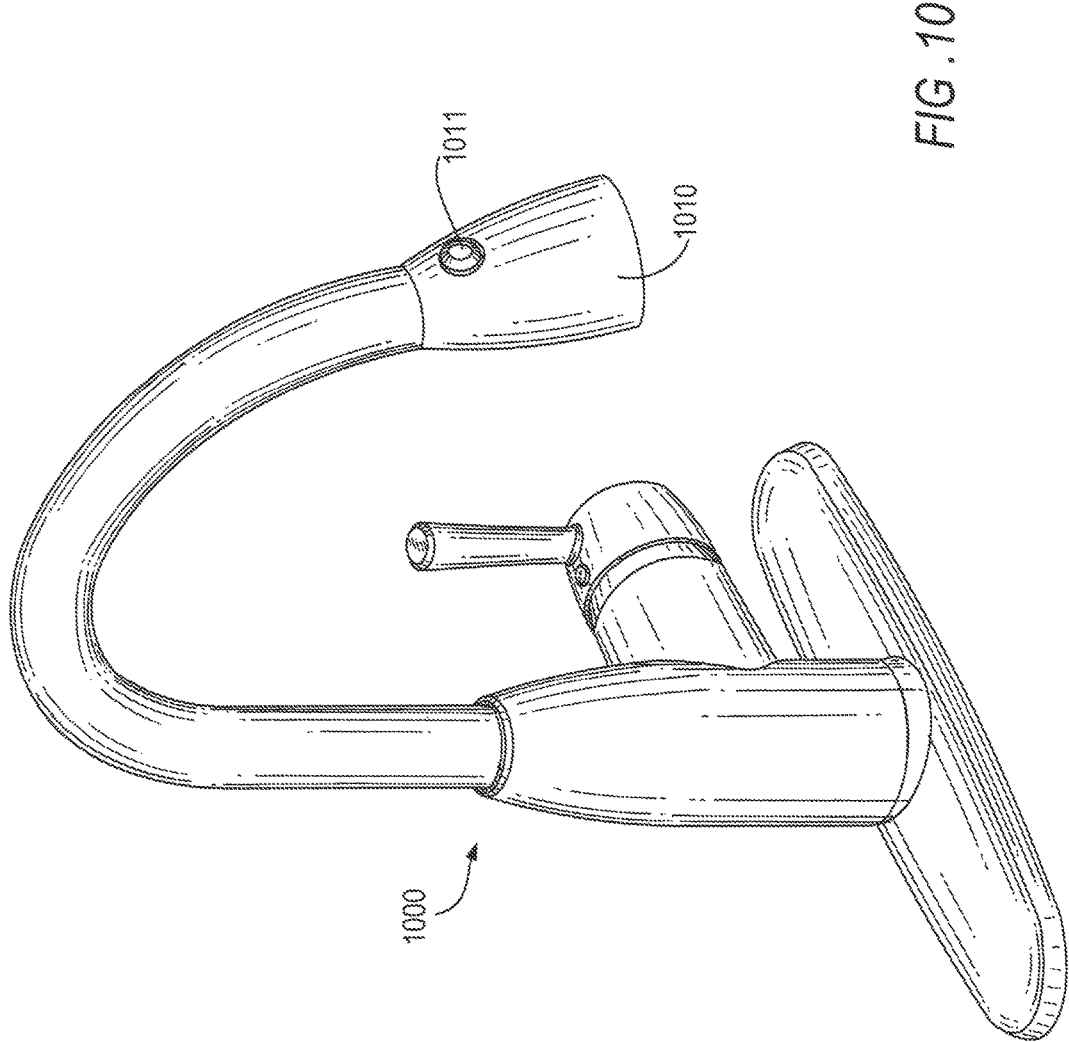
FIG. 10 is a perspective view of a faucet having an integrated filtration system, in accordance with an embodiment of the present invention.

It is to be appreciated that the spray head can alternatively include either an aerator or a shower spray outlet, but not both. FIG. 10 is a perspective view of a faucet 1000, illustrating a spray head 1010 in docked and undocked positions. In contrast to spray head 110 of FIGS. 4 and 5, spray head 1010 has a filtered water activation switch 1011, but does not include an unfiltered water output selection switch (nor its associated internal components). Spray head 1010 also includes only one output for unfiltered water (e.g., only an aerator with aerated outlets or only a shower spray outlet with nozzles). The unfiltered waterway tunnel in spray head 1010 is thus continuously fluidly coupled to that one output, without the need for a diverting mechanism within spray head 1010.

Accordingly, an integrated faucet filtration system advantageously equips a pull-out or pull-down spray head with filtered water output capability, which eliminates the need for a separate side faucet for dispensing filtered water, and provides an easy-to-maintain sink deck environment.

It should be understood that the various filtered and unfiltered waterways and tunnels in each of the multi-channel hose, spray head, and diverter-equipped T-connector are separate from one another, and thus prevents cross-contamination of the two types of water throughout the system.

It will thus be seen that the aspects, features and advantages made apparent from the foregoing are efficiently attained and, since certain changes may be made without departing from the spirit and scope of the invention, it is intended that all matter contained herein shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A faucet, comprising:
   a spout;
   a spray head;
   a multi-channel hose fluidly coupled to the spray head and disposed in the spout;
   a valve cartridge configured to control flow of unfiltered water;
   a water filter configured to provide filtered water; and
   a connector having a first branch configured to receive unfiltered water from the valve cartridge, a second branch configured to receive filtered water from the water filter, and a third branch configured to deliver the filtered and unfiltered water from the first and second branches to different channels of the multi-channel hose;
   wherein the connector comprises a water-controlled diverter.

2. The faucet of claim 1, wherein the channels of the multi-channel hose are concentric with one another.

3. The faucet of claim 1, further comprising a mixed water hose fluidly coupled to the valve cartridge and configured to deliver unfiltered water to the first branch.

4. The faucet of claim 1, wherein the multi-channel hose comprises a filtered water channel and an unfiltered water channel, and wherein the third branch is configured to deliver unfiltered water from the first branch to the unfiltered water channel and filtered water from the second branch to the filtered water channel.

5. The faucet of claim 4, wherein the third branch of the connector comprises a filtered water path configured to fluidly couple to the filtered water channel of the multi-channel hose, and an unfiltered water path configured to fluidly couple to the unfiltered water channel of the multi-channel hose.

6. The faucet of claim 5, wherein the filtered and unfiltered water paths are concentric with one another.

7. The faucet of claim 4, wherein the spray head comprises a filtered waterway and an unfiltered waterway, the filtered waterway being fluidly coupled to the filtered water channel of the multi-channel hose, and the unfiltered waterway being fluidly coupled to the unfiltered water channel of the multi-channel hose.

8. The faucet of claim 7, wherein the spray head further comprises an activation device configured to allow selective output of filtered and unfiltered water from the spray head.

9. The faucet of claim 8, wherein the device is a switch configured to occupy a first position and a second position such that, when the switch is in the first position, only filtered water from the filtered waterway is output from the spray head and, when the switch is in the second position, only unfiltered water from the unfiltered waterway is output from the spray head.

10. The faucet of claim 8, wherein the activation device is spring-loaded.

11. The faucet of claim 1, wherein the diverter is configured to assume a closed position when the valve cartridge is deactivated such that (i) no unfiltered water enters the first branch from the valve cartridge and (ii) filtered water in the second branch is restricted from passing to the third branch.

12. The faucet of claim 1, wherein the diverter is configured to assume an open position when the valve cartridge is activated such that (i) unfiltered water enters the first branch from the valve cartridge and passes to the third branch and (ii) filtered water in the second branch passes to the third branch.

13. The faucet of claim 1, wherein the faucet is one of a pull-out and a pull-down type.

14. The faucet of claim 1, wherein the valve cartridge is configured to control flow of unfiltered water by mixing water from hot and cold water sources.

15. The faucet of claim 14, wherein the water filter is configured to provide filtered water by processing unfiltered water from the cold water source.

16. A filtration system for a pull-down faucet, the faucet having a spout, a spray head, and a valve cartridge configured to control flow of unfiltered water, the system comprising:
a multi-channel hose configured to fluidly couple to the spray head;
a water filter configured to provide filtered water; and
a connector having a first branch configured to receive unfiltered water from the valve cartridge, a second branch configured to receive filtered water from the water filter, and a third branch configured to deliver filtered and unfiltered water from the first and second branches to different channels of the multi-channel hose;
wherein the connector comprises a diverter configured to assume:
a closed position when the valve cartridge is deactivated such that (i) no unfiltered water enters the first branch from the valve cartridge and (ii) filtered water in the second branch is restricted from passing to the third branch; and
an open position when the valve cartridge is activated such that (i) unfiltered water enters the first branch from the valve cartridge and passes to the third branch and (ii) filtered water in the second branch passes to the third branch.

17. The system of claim 16, wherein the channels of the multi-channel hose are concentric with one another.

18. The system of claim 16, wherein the multi-channel hose comprises a filtered water channel and an unfiltered water channel, and wherein the third branch is configured to deliver unfiltered water from the first branch to the unfiltered water channel and filtered water from the second branch to the filtered water channel.

19. The system of claim 18, wherein the third branch of the connector comprises a filtered water path configured to fluidly couple to the filtered water channel of the multi-channel hose, and an unfiltered water path configured to fluidly couple to the unfiltered water channel of the multi-channel hose.

20. The system of claim 18, wherein the spray head comprises:
a filtered waterway configured to fluidly couple to the filtered water channel of the multi-channel hose;
an unfiltered waterway configured to fluidly couple to the unfiltered water channel of the multi-channel hose; and
an activation device having a switch configured to occupy a first position and a second position such that, when the switch is in the first position, only filtered water from the filtered waterway is output from the spray head and, when the switch is in the second position, only unfiltered water from the unfiltered waterway is output from the spray head.

21. A filtration system for a pull-down faucet, the faucet having a spout, a spray head, and a valve cartridge configured to control flow of unfiltered water, the system comprising:
a multi-channel hose configured to fluidly couple to the spray head;
a water filter configured to provide filtered water; and
a connector having a first branch configured to receive unfiltered water from the valve cartridge, a second branch configured to receive filtered water from the water filter, and a third branch configured to deliver filtered and unfiltered water from the first and second branches to different channels of the multi-channel hose,
wherein the connector comprises a water-controlled diverter.

22. A faucet, comprising:
a spout;
a spray head;
a multi-channel hose fluidly coupled to the spray head and disposed in the spout;
a valve cartridge configured to control flow of unfiltered water;
a water filter configured to provide filtered water; and
a connector having a first branch configured to receive unfiltered water from the valve cartridge, a second branch configured to receive filtered water from the water filter, and a third branch configured to deliver the filtered and unfiltered water from the first and second branches to different channels of the multi-channel hose,
wherein the connector comprises a diverter configured to assume:
a closed position when the valve cartridge is deactivated such that (i) no unfiltered water enters the first branch from the valve cartridge and (ii) filtered water in the second branch is restricted from passing to the third branch; and
an open position when the valve cartridge is activated such that (i) unfiltered water enters the first branch from the valve cartridge and passes to the third branch and (ii) filtered water in the second branch passes to the third branch.

* * * * *